Figure 1:
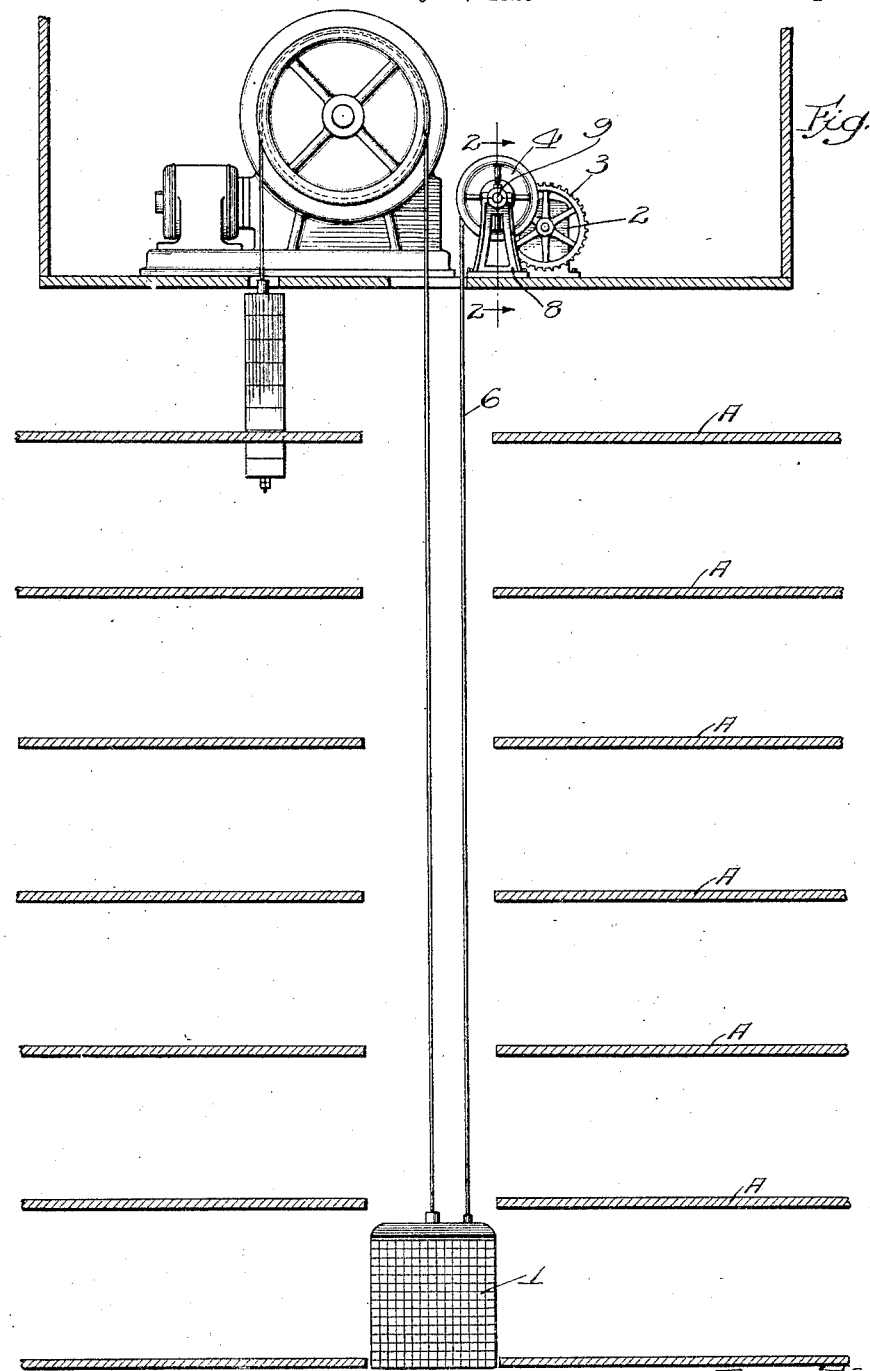

Oct. 26, 1926.

E. G. K. ANDERSON 1,604,214

AUTOMATIC FLOOR SELECTING MEANS FOR ELEVATORS

Filed May 18, 1925 3 Sheets-Sheet 1

Inventor:
Ernst G. K. Anderson
By: Wm. F. Freudenreich
Atty

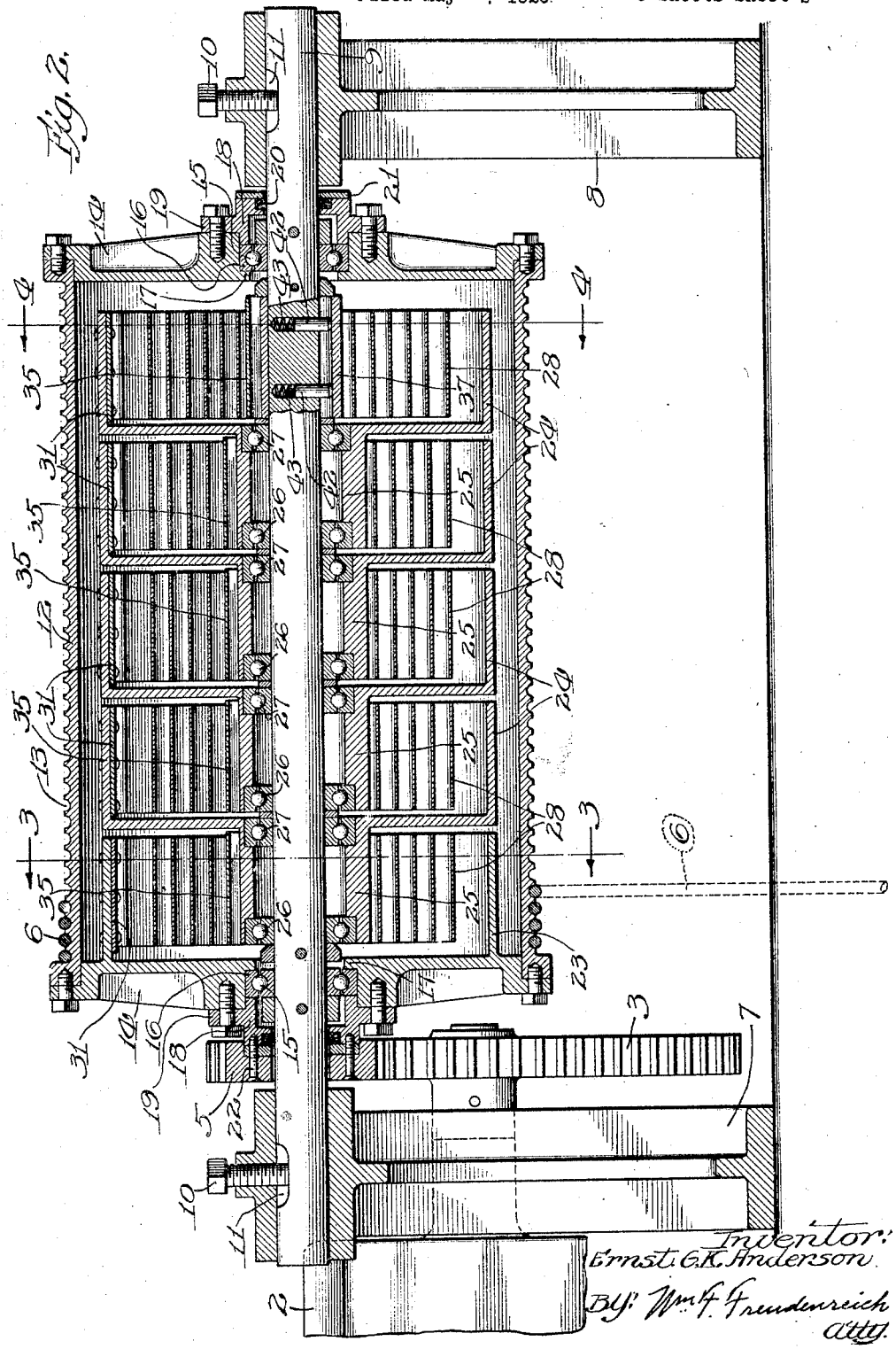

Oct. 26, 1926.  
E. G. K. ANDERSON  
1,604,214  
AUTOMATIC FLOOR SELECTING MEANS FOR ELEVATORS  
Filed May 18, 1925  3 Sheets-Sheet 3
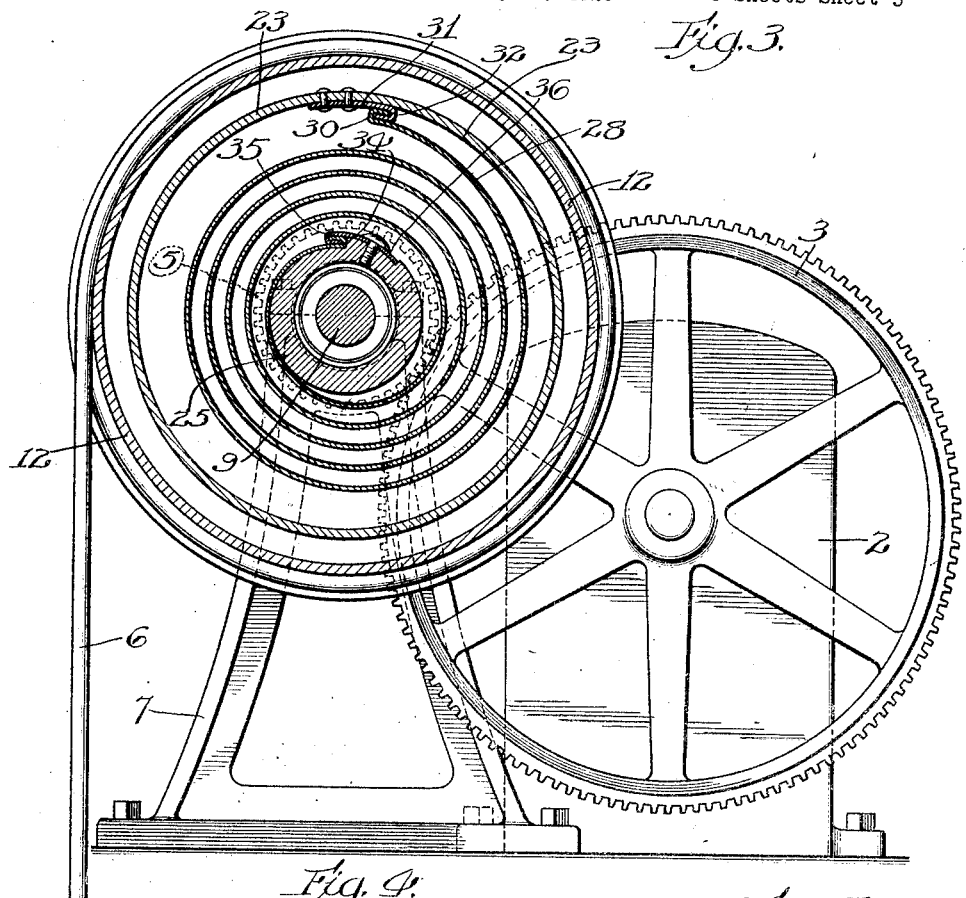
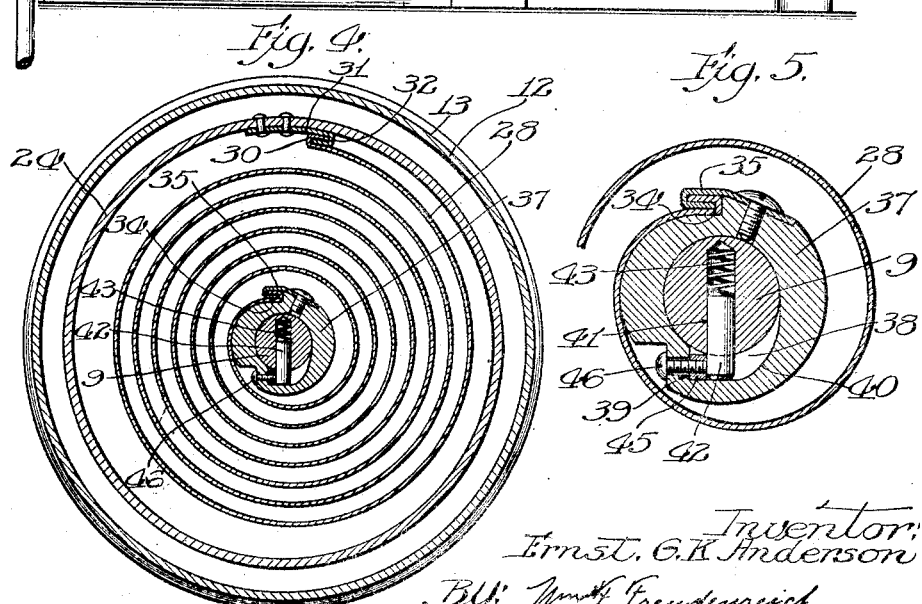
Inventor:  
Ernst G. K. Anderson  
By Freudenreich  
atty.

Patented Oct. 26, 1926.

1,604,214

UNITED STATES PATENT OFFICE.

ERNST G. K. ANDERSON, OF EVANSTON, ILLINOIS.

AUTOMATIC FLOOR-SELECTING MEANS FOR ELEVATORS.

Application filed May 18, 1925. Serial No. 30,909.

In order that elevators, dumbwaiters, and the like may be controlled automatically to stop at any desired floor or landing, it is necessary to have associated with them floor selecting mechanisms that are operated by and in synchronism with the elevators or the like. It is usual for selectors of this kind to have a rotatable element operated by a cable attached at its ends to the elevator, thus forming a closed loop. In this old construction there are two lengths of cable that extend from the top to the bottom of the elevator shaft and, perhaps, require openings to be cut through parts of the building in which the elevator is located.

The principal object of the present invention is to produce a simple and novel means for operating the rotatable element of a floor selector from an elevator or the like, using only a single length of cable between the elevator and the selector.

In carrying out my invention I employ a spring motor provided with a drum on which is wound one end of a cable whose other end is fastened to the elevator; the arrangement being such that the selector is driven by the motor in both directions, the spring operates the motor in one direction and takes up slack in the cable, and the cable operates the motor in the other direction and winds up the spring as the elevator descends and withdraws the cable from the drum.

Viewed in one of its aspects, my invention may be said to have for its object to produce a simple, novel and efficient spring motor for operating a floor selector for elevators or the like.

I prefer to house the motor spring within the drum and to cause the spring to act directly on the drum, thus necessitating a very long spring. Viewed in another of its aspects, the present invention may be said to have for its object to produce a simple and novel spring motor including a rotatable drum and a series of long spiral springs housed within and acting directly on the drum.

In the event that the cable should break while the motor spring is wound up more or less, the spring might be damaged due to the sudden release and recoil at one end while the other end is anchored. I have therefore provided a simple and novel clutch connection between the stationary end of the spring and its support, such that said end is normally rigidly anchored but, in case the cable breaks, releasing the pull on the anchored end of the spring, that end is free to revolve on its support.

Another object of my invention is to produce a simple and novel means for attaching an end of a spring made out of flat band material, in such a way that the spring is not apt to break at the point of attachment.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of an elevator apparatus arranged in accordance with my invention, shown as applied to a building having several floors one above the other, the building being shown more or less diagrammatically; Fig. 2 is a vertical section on an enlarged scale through the motor for operating the selector, this section being approximately on line 2—2 of Fig. 1; Fig. 3 is a section taken approximately on line 3—3 of Fig. 2, showing both the motor and the selector; Fig. 4 is a section taken approximately on line 4—4 of Fig. 2, only the motor being shown; and Fig. 5 is a view similar to Fig. 4, on a larger scale, showing only the supporting shaft and a short section of the inner end of the spring.

Referring to Fig. 1 of the drawings, 1 represents an elevator movable vertically through an elevator shaft extending past a plurality of floors, indicated at A. Beyond the top of the shaft is supported a floor selector 2 of any usual or suitable type. The selector has a rotatable part to which is fixed a gear wheel 3 lying on the outside of the selector casing. A spring motor provided with a cable reel or drum 4 provided with a pinion 5 that meshes (as shown in Fig. 2) with the gear wheel. A cable 6 is wound at one end around the drum and has its other end attached to the elevator. The parts are so constructed and arranged that when the elevator rises, the spring motor takes up the slack in the cable and at the same time turns the rotatable member of the selector; whereas, when the elevator descends, it withdraws the cable from the drum, turning the latter and winding up the spring, while at the same time the rotatable element of the selector is turned in the opposite direction from that in which it turns while the elevator is rising.

It will thus be seen that there is only a single length of cable that may extend down the elevator shaft and be attached to the top of the elevator, avoiding the necessity of two lengths or runs, together with guiding pulleys below the bottom of the elevator shaft, and avoiding the cutting of holes in any floor or wall to accommodate the cable for operating the selector.

The selector may be of any usual or suitable type, as may also the motor, when the invention is viewed in its proper aspects. However, I have devised a special spring motor which makes my improved control system reliable and efficient in operation. The details of the motor are shown in Figs. 2 to 5.

Referring to Figs. 2 to 5, 7 and 8 represent two pedestals between the upper ends of which extends a horizontal shaft 9 locked in place by suitable set screws 10 entering notches 11 in the shaft, or otherwise, so as to be securely held against rotation.

Surrounding the shaft between the pedestals is a cylindrical drum 12 having in a periphery a groove 13 extending spirally around the same for receiving the cable 6, thus insuring that the cable will be wound up evenly. The drum consists of a cylindrical shell supported at the ends by suitable heads 14, 14. The heads are rotatably mounted on the shaft upon ball bearings 15. The rotatable ball race 16 in each head is fitted in the central opening in the head and abuts on the inner side against a flange or shoulder 17. The member 16 is held against the flange or shoulder by a sleeve 18 fitting into the central opening in the head against the outer face of the ball race, and provided with a surrounding flange 19 that fits against the side of the head and is bolted thereto. In the outer end of the shell 18 is a suitable packing 20 held in place by plate or washer 21 surrounding the shaft and engaged with the extreme outer end of the sleeve. The pinion 5, to which reference has heretofore been made, is attached to the member 18 at one end of the drum, by means of screws 22, or otherwise.

The head of the cylindrical drum or reel nearest the selector is provided with an inwardly projecting cylindrical flange 23. Between this flange and the opposite end of the drum or reel are a plurality of cup-shaped members 24, 24 each having a cylindrical wall similar to the flange 23 and each having a hub 25 projecting laterally from the bottom of the cup. The hub from the first of these cups surrounds the supporting shaft within the space surrounded by the annular flange 23; while the hub of each successive cup projects into the adjacent cup. If the head 14 with its flange 23 is termed a cup, the construction therefore consists of a series of cups arranged one upon the other, each cup, except one, having a hub that projects from the bottom into the adjacent cup. Each hub is rotatably supported on the shaft 9 by means of two separated ball bearings 26 and 27.

Within each cup is a spiral spring of flat material, namely a strong clock spring, as indicated at 28. The outer end of the first spring on the left hand of Fig. 2, is anchored to the flange 23, while the inner end is anchored to the hub of the next cup-shaped member. Similarly each spring in the next three cups is fastened at its outer end to the cylindrical wall of that cup and its inner end to the hub nested within the cup. The right hand spring, while attached at its outer end to the cylindrical wall of the right hand cup, is anchored to the shaft. The several springs are therefore connected end to end to form, in effect, a single long spring, one end of which is fastened to the rotatable drum or reel and the other to the supporting shaft.

Springs of the type disclosed herein often break at the points at which they are attached to their supports or to the members that they are to drive or by which they are to be driven and, to prevent this, I have devised a simple means of attachment or anchor for the ends of a spiral spring of flat material. Fig. 3 illustrates my improved connection at both ends of one of the springs. The outer end of the spring is annealed and bent outwardly and backwardly to form a hook 30. A small metal plate 31, of the same width as the spring material, is riveted or otherwise fastened to the cylindrical wall 23 or the corresponding wall of one of the other cups, and has one end bent into a hook 32 oppositely disposed with respect to the hook 30 so that the two hooks may be interlocked with each other across the full width of the spring. At the inner end of the spring is a second annealed portion bent into a hook 34 interlocked with a hook 35 on the end of a plate 36 attached to one of the hubs. The connection between the ends of the spring and the two members to which these ends are to be attached, may be quickly made and, since the hooked portions extend across the entire width of the spring material, the connection, once made, is secure and the stresses are so distributed that there is little danger that the spring will break in the vicinity of either end.

In order to prevent injury to the spring or springs in the event that the actuating cable breaks, I have placed between the shaft and that end of the spring that is connected to the shaft, a clutch that positively anchors this end of the spring to the shaft as long as a pull is being exerted on that end, but which permits said end to revolve freely about the shaft in the event that the drum is suddenly released as, for example, by the breaking of the cable, thus preventing the spring from causing a portion thereof to be bent back on itself and damaging the spring.

The clutch is best shown in Figs. 2 and 5. The inner end of the spring, instead of being fastened directly to the shaft, is anchored to a sleeve 37 and is rotatable on the shaft. The opening through the sleeve is not entirely cylindrical, but is enlarged laterally in one direction to form a pocket 38 having at one side an abrupt face or shoulder 39 and having at the opposite side a cam shaped or gently curved face 40 that merges into the cylindrical bore in which the shaft fits. The shaft has one or more radial holes 41 drilled into it between the ends of the member 37, and in each of these holes is a pin 42 that is constantly pressed outwardly by a small spring 43 located in the hole behind the inner end of the pin. Normally these pins project outwardly from the shaft into the pocket in the member 37. The parts are so proportioned that the spring normally exerts a pull on the member 37 in such direction that the abrupt shoulder 39 is forced against the side of the pins, thus preventing the member 37 from rotating relatively to the shaft. The normal tendency, in other words, is for the member 37 to turn in the counter clockwise direction, as viewed in Fig. 5. In the event that the cable breaks, releasing what may be termed the opposite end of the spring, there is no longer any pull on the end under consideration, and it tends to move in the clockwise direction, as viewed in Fig. 5. In moving in the clockwise direction, the spiral spring carries the member 37 with it. During this movement, the pins ride up the inclined surface 40 until, finally, they are forced back within the cylindrical periphery of the shaft, leaving the member 37 free to make a complete rotation on the shaft, whereupon the pins will again move outwardly into the pocket, only to be forced back into the shaft as the member 37 continues to revolve.

The member 37 will ordinarily be made of comparatively soft material and, in order to prevent the shoulder 39 from being worn through contact with the pins 42, I place a wearing block 45 within the pocket 38 and in front of the shoulder 39. This block may be secured in place by one or more screws 46 extending through that wall of the member 37 of which the face or shoulder 39 forms the inner face.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination an elevator, a floor selector, a spring motor having a drum for operating said selector, a cable attached at one end to the elevator and wound at its other end about said drum in a direction to cause energy to be stored up in the motor when the elevator descends and to utilize a portion of such energy to take up the slack in the cable when the elevator ascends.

2. In combination, a floor selector having a movable actuator, a spring motor provided with a drum connected to said actuator, and a cable having one end wound upon the drum and adapted to have its other end attached to a member movable past a plurality of floors; whereby the motor moves said actuator in one direction and takes up slack in the cable, by its own power, and the cable serves to actuate the motor to store up energy therein and, through the motor, operate the actuator in the direction opposite to the aforesaid direction.

3. In combination, a floor selector having an actuating gear wheel, a rotatable drum having a gear meshing with the aforesaid gear wheel, a spring located within the drum, the spring being adapted to be wound up when the drum is turned in one direction and tending to turn the drum in the opposite direction, and a cable wound at one end around the drum and adapted to be fastened to a member movable past a plurality of floors at its other end, the parts being so arranged that when the cable is drawn off the drum it turns the latter in the direction to wind up the spring whereas, when the spring is free to do so, it rotates the drum in a direction to wind up the cable thereon.

In testimony whereof, I sign this specification.

ERNST G. K. ANDERSON.